(12) United States Patent
Park et al.

(10) Patent No.: US 10,533,296 B2
(45) Date of Patent: Jan. 14, 2020

(54) SYSTEM AND METHOD FOR CONTROLLING LAND DEFORMATION, AND METHOD FOR OPTIMAL DESIGN OF WELL IN SYSTEM FOR CONTROLLING LAND DEFORMATION

(71) Applicant: DONG-A UNIVERSITY RESEARCH FOUNDATION FOR INDUSTRY-ACADEMY COOPERATION, Busan (KR)

(72) Inventors: Namsik Park, Busan (KR); Byunghee Nam, Busan (KR)

(73) Assignee: DONG-A UNIVERSITY RESEARCH FOUNDATION FOR INDUSTRY-ACADEMY COOPERATION, Busan (KR)

( * ) Notice: Subject to any disclaimer, the term of this patent is extended or adjusted under 35 U.S.C. 154(b) by 0 days.

(21) Appl. No.: 15/518,084

(22) PCT Filed: Apr. 27, 2016

(86) PCT No.: PCT/KR2016/004405
§ 371 (c)(1),
(2) Date: Apr. 10, 2017

(87) PCT Pub. No.: WO2017/131290
PCT Pub. Date: Aug. 3, 2017

(65) Prior Publication Data
US 2018/0327991 A1    Nov. 15, 2018

(30) Foreign Application Priority Data

Jan. 25, 2016    (KR) .................. 10-2016-0008583

(51) Int. Cl.
*E02D 3/10*        (2006.01)
*E21B 41/00*       (2006.01)
(Continued)

(52) U.S. Cl.
CPC .............. *E02D 3/10* (2013.01); *E02D 31/10* (2013.01); *E21B 41/00* (2013.01); *G06F 17/50* (2013.01); *G01V 99/005* (2013.01)

(58) Field of Classification Search
CPC combination set(s) only.
See application file for complete search history.

(56) References Cited

FOREIGN PATENT DOCUMENTS

| CN | 204040012 | * | 12/2014 |
| JP | 2014101661 A | | 6/2014 |

(Continued)

OTHER PUBLICATIONS

Ami Adini, Environmental Enlightenment #129, Reissued Jan. 18, 2016, 2 pages.

(Continued)

*Primary Examiner* — Sean D Andrish
(74) *Attorney, Agent, or Firm* — Cantor Colburn LLP

(57) ABSTRACT

Disclosed are a system and method for controlling land deformation, and a method for optimal design of a well in a system for controlling a well in a system for controlling land deformation. The land deformation control system with respect to a land including an confined aquifer and an aquiclude above the confined aquifer includes a first well for water pumping from or water injecting into the confined aquifer; and one or more second wells spaced apart from the first well by a predetermined distance and having a lower end portion positioned in the aquiclude, wherein a water level of the second well is maintained at a preset water level value to control an amount of change in water head of the aquiclude, which drops due to pumping of the confined aquifer or rises due to injection with respect to each of the second wells.

4 Claims, 14 Drawing Sheets

(51) Int. Cl.
    *G06F 17/50*     (2006.01)
    *E02D 31/10*     (2006.01)
    *G01V 99/00*     (2009.01)

(56) References Cited

FOREIGN PATENT DOCUMENTS

| | | | |
|---|---|---|---|
| KR | 100957673 B1 | | 5/2010 |
| KR | 1020100071523 A | | 6/2010 |
| KR | 101205445 B1 | | 11/2012 |
| WO | WO 93/22510 | * | 11/1993 |

OTHER PUBLICATIONS

Park et al., "Design of Optimal Wet-Season Injection Well for Augmenting Groundwater Resources in Coastal Areas", Journal of Korea Water Resources Association, May 2009, pp. 415-424, vol. 42, No. 5, English abstract.
Nam et al., "Changes in hydraulic head and deformation of clay layer due to pumping and injection in a confined aquifer", Journal of Korea Water Resources Association, May 2015, 1 page.
Korean Office Action for corresponding Korean Patent Application No. 10-2016-0013400 dated Aug. 11, 2016.
Korean Office Action for corresponding Korean Patent Application No. 10-2016-0008583 dated Jul. 17, 2017.
International Search Report dated Nov. 7, 2016 for PCT/KR2016/004405.

* cited by examiner

FIG. 2A
FIG. 2B
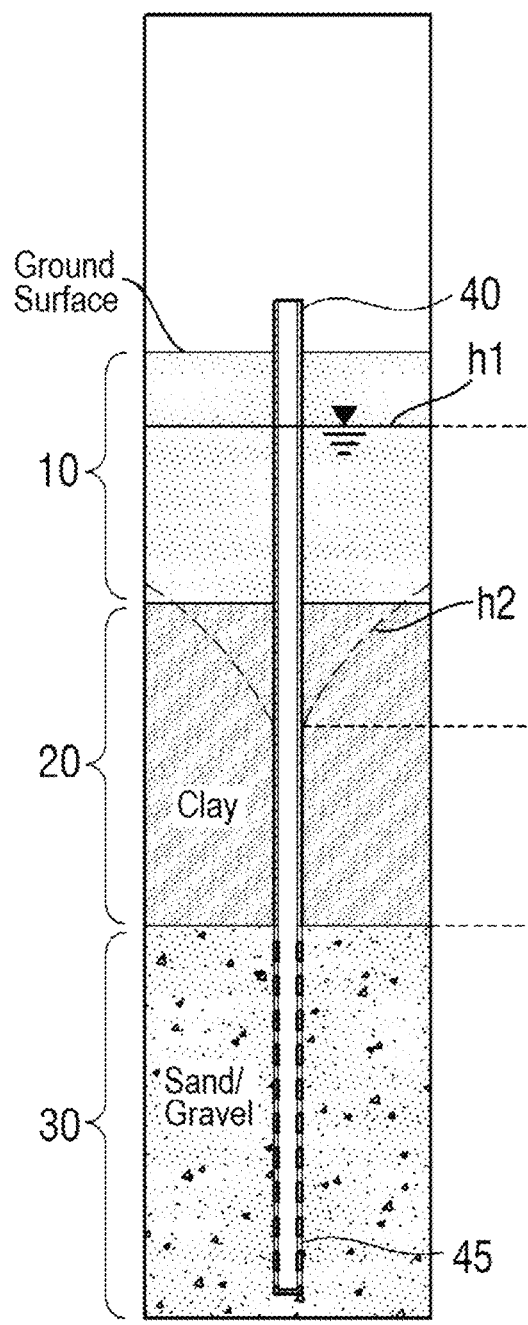
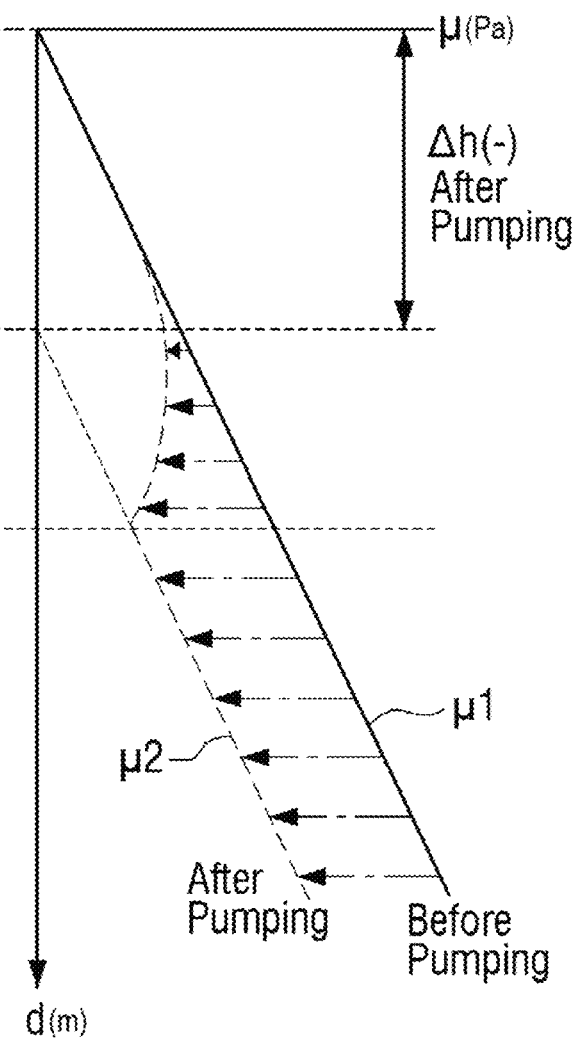

— Water Head in depth A (effect of clay well)
--- Water Head in case without clay well in depth A

FIG. 7A  FIG. 7B
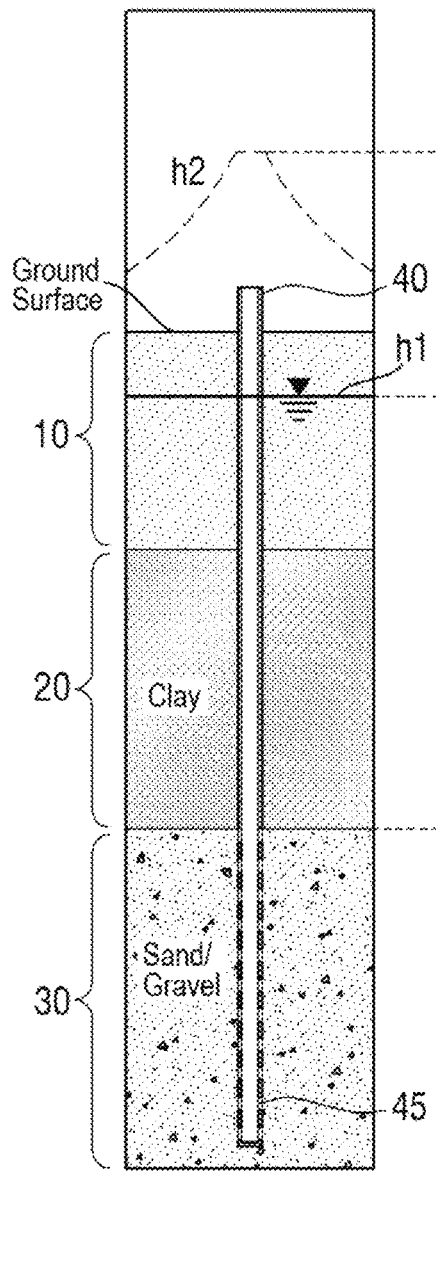
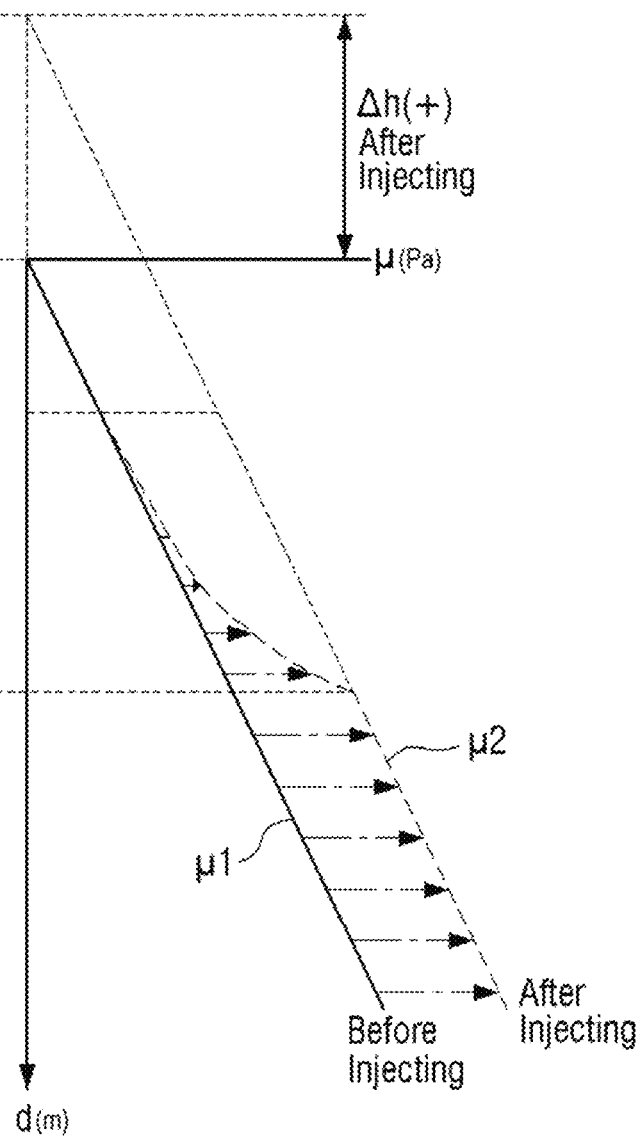

SYSTEM AND METHOD FOR CONTROLLING LAND DEFORMATION, AND METHOD FOR OPTIMAL DESIGN OF WELL IN SYSTEM FOR CONTROLLING LAND DEFORMATION

BACKGROUND

(1) Technical Field

The present invention relates to a system and method for controlling land deformation, and a method for optimal design of a well in a system for controlling land deformation, and more particularly, to a system and method for controlling land deformation, and a method for optimal design of a well buried in an aquiclude in a system for controlling land deformation, for preventing and controlling land deformation such as land subsidence or land rise due to an unstable aquiclude above a confined aquifer via pumping or injection of the confined aquifer.

(2) Background Art

When an aquifer is developed below an aquiclude such as a clay layer, underground water in the aquifer may be in an unconfined state without a free surface. Such an aquifer is referred to as a confined aquifer. When underground water is pumped from a confined aquifer, an underground water level of the confined aquifer is lowered and, accordingly, an underground water level of an aquiclude above the confined aquifer is also lowered, causing consolidation of the aquiclude and a phenomenon referred to as land subsidence occurs.

Land subsidence occurs in all parts of the world such as Thailand, Vietnam, China, Japan, and Mexico and, recently, land subsidence has also become a social issue in Korea. Since land subsidence frequently occurs due to pumping of underground water in a confined aquifer and it is nearly impossible to recover the consolidated aquiclude, there has been no alternative except for prevention of consolidation. That is, according to prior art, when a land subsidence phenomenon is discovered, the pumping operation in a confined aquifer is stopped or water is re-injected into the confined aquifer.

In addition, on the contrary to underground water pumping, when water is injected into the confined aquifer, a water level of an aquifer rises and a water head of an aquiclude also rises, causing aquiclude deformation. This also causes deformation of a ground surface and, thus, there is a need for a method for prevention thereof.

DETAILED DESCRIPTION

Technical Object

An exemplary embodiment of the present invention provides a method of practically managing aquiclude deformation in preparation for various uses of a confined aquifer, such as pumping or injection of underground water of the confined aquifer.

An exemplary embodiment of the present invention provides a system and apparatus for controlling change in water head of an aquiclude by installing a second well buried in the aquiclude around a pumping/injection well of a confined aquifer and controlling a water level of the second well to a predetermined height.

An exemplary embodiment of the present invention provides a system and method for optimal design of a second well for effectively preventing land deformation.

Technical Solving Method

According to an exemplary embodiment, there is provided a land deformation control system with respect to a land including a confined aquifer and an aquiclude above the confined aquifer, the system including a first well for water pumping from or water injecting into the confined aquifer, and one or more second wells spaced apart from the first well by a predetermined distance and having a lower end portion positioned in the aquiclude, wherein an amount of change in water head of the aquiclude, which drops or rises due to the pumping or injection of the confined aquifer, is controlled by maintaining a water level of each of the second wells at a preset water level value.

According to an exemplary embodiment, there is provided a method of controlling land deformation using a land deformation control system with respect to a land including a confined aquifer and an aquiclude above the confined aquifer, wherein the system includes a first well for pumping water from or injecting water into the confined aquifer, and one or more second wells spaced apart from the first well by a predetermined distance and having a lower end portion positioned in the aquiclude, and the method includes maintaining a water level of the second well at a preset water level value with respect to each of the second wells when underground water is pumped from the confined aquifer or is injected into the confined aquifer.

According to an exemplary embodiment, there is provided a method for optimal design of a second well using a computer in a system for controlling land deformation by maintaining a water level in the second well buried in an aquiclude at a preset water level with respect to a land including a confined aquifer in which a first well for pumping or injection is buried and the aquiclude above the confined aquifer, the method including (a) applying an optimization algorithm to initial condition data about the aquiclude to generate n (n is an integer equal to or greater than 2) decision variable sets D of the second well, (b) applying an underground water flow model to each of the n decision variable sets D to generate n prediction results of change in water head of the aquiclude, (c) calculating a performance evaluation value of each of the n prediction results, and (d) selecting a decision variable set D with a maximum performance evaluation value.

According to an exemplary embodiment, there is provided a computer readable recording medium having recorded thereon a program for executing the aforementioned method.

Advantageous Effects

According to one or more embodiments of the present invention, change in water head of an aquiclude may be prevented by installing a second well buried in the aquiclude around a pumping/injection well of a confined aquifer and controlling a water level of the second well to a predetermined height.

According to one or more embodiments of the present invention, even if a pumping/injection well of a confined aquifer is being used, change in water head of an aquiclude may be prevented by controlling a water level of a second well and, thus, land subsidence may be advantageously prevented while underground water of a confined aquifer is still used.

According to one or more embodiments of the present invention, a system and method for optimal design of a second well may propose an optimized design model of a second well, for effectively preventing land deformation under a given condition.

BRIEF DESCRIPTION OF DRAWINGS

FIGS. 2A and 2B are diagrams for explanation of vertical change in water head according to a depth when underground water is pumped in an equilibrium state.

FIGS. 7A and 7B are diagrams for explanation of vertical change in water head according to a depth during underground water injection in an equilibrium state.

BEST MODE FOR EMBODYING THE INVENTION

Figure 1:
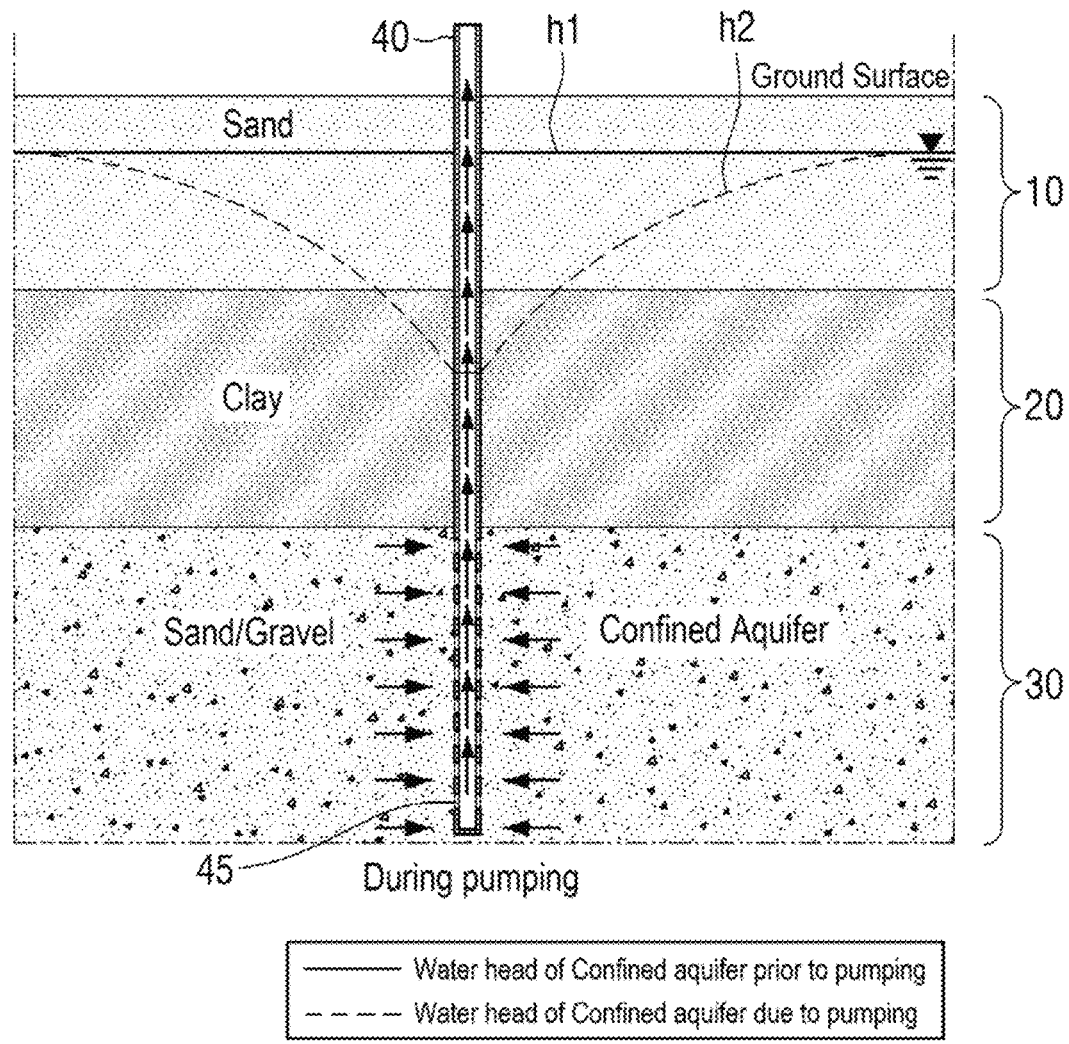
FIG. 1 is a diagram for explanation of change in water head of a confined aquifer when underground water is pumped.

Exemplary embodiments will now be described more fully with reference to the accompanying drawings to clarify aspects, other aspects, features and advantages of the present invention. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art.

In the drawings, the lengths, thicknesses, and areas of elements are exaggerated for effective explanation.

As used herein, the singular forms are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiments, certain detailed explanations of the related art are omitted when it is deemed that they may unnecessarily obscure the essence of the present invention.

Hereinafter, a land deformation control system according to an exemplary embodiment of the present invention when water is pumped from a confined aquifer will be described with reference to FIGS. 1 to 4C.

FIG. 1 is a diagram for explanation of change in water head of a confined aquifer when underground water is pumped. A layer structure of a region in which underground water is pumped is schematically illustrated in FIG. 1 and is assumed to include an overburden 10, an aquiclude 20, and a confined aquifer 30 which are positioned downward from a ground surface. The overburden 10 may be a layer with a thickness of several tens of centimeters to several tens of meters from the ground surface. The aquiclude is a ground layer including a soil with fine porosity and very low hydraulic conductivity. Although the drawing illustrates only clay as components of the aquiclude 20, in general, the aquiclude contains arbitrary soil components with low hydraulic conductivity, such as clay, grit, or a hardpan layer. Hereinafter, in exemplary embodiments of the present invention, for convenience of description, this will be referred to as the "aquiclude" or "clay layer".

A confined aquifer is an aquifer, upper and lower portions of which are surrounded by an aquiclude or an impermeable layer, and contains soil components with high hydraulic conductivity. Although FIG. 1 illustrates only sand and gravel as components of the confined aquifer 30, in general, the confined aquifer contains various rock components such as sand, gravel, sandstone, an alluvial layer, porous limestone, crack marble, crack granite, and clastic quartzite.

The confined aquifer 30 is subjected to pressure from an upper surface and, thus, an underground water level in a well inserted up to the confined aquifer 30 may be higher than an upper boundary of the aquifer. That is, as illustrated in FIG. 1, when a pumping well 40 is buried up to the confined aquifer 30, an initial underground water level (hereinafter, referred to as "water head") of the confined aquifer 30 has an imaginary water level indicated by h1. Then, when underground water in the confined aquifer 30 is pumped through a plurality of through holes 45 formed in a lower portion of the pumping well 40, an amount of underground water may be gradually reduced with respect to the pumping well 40 and, thus, a water head may drop as indicated by a plot h2, as illustrated in the drawing.

FIGS. 2A and 2B are diagrams for explanation of vertical change in water head according to a depth when underground water is pumped in an equilibrium state. A layer structure of FIG. 2A is the same as that of FIG. 1. In a graph of FIG. 2B, a vertical axis indicates a layer depth d and a horizontal axis indicates a pore water pressure μ at each depth d. As indicated by a solid line plot μ1, an initial pore water pressure μ1 is assumed to be increased in proportion to the depth d.

When pumping is not performed, that is, immediately after the pumping well 40 is buried in the confined aquifer 30, a water head of underground water of the confined aquifer 30 may be h1 and may drop to h2 as underground water is pumped through the well 40, as described with reference to FIG. 1.

The pore water pressure μ according to a depth prior to pumping is indicated by a solid line plot μ1 in the right graph. The confined aquifer 30 has high hydraulic conductivity and, thus, when underground water is pumped from the confined aquifer, an underground water level of the confined aquifer almost immediately changes. Accordingly, the pore water pressure μ in the confined aquifer may be rapidly and almost constantly reduced over an entire depth of the confined aquifer and may change as indicated by a dotted line μ2.

In this case, when a water head of the aquiclude 20 changes, the water head begins to gradually change from a lower portion of the aquiclude 20, which contacts the confined aquifer 30, due to low permeability. In many cases, there is a free surface aquifer, which is completely separated from the confined aquifer 30 below the aquiclude 20, on the aquiclude 20 and, in this case, a water head above the aquiclude may not nearly change. Accordingly, the water head of the aquiclude 20 most rapidly changes in a lower portion thereof and change in the water head of the aquiclude 20 spreads upward over time. That is, as indicated by a curved portion of a dotted line plot μ2 of FIG. 2B, the pore water pressure μ in the aquiclude 20 is nearly unaffected, whereas the pore water pressure drops at a lower portion of the aquiclude, that is, a portion adjacent to the confined aquifer 30, which is almost the same as in the confined aquifer 30.

Figure 3A:
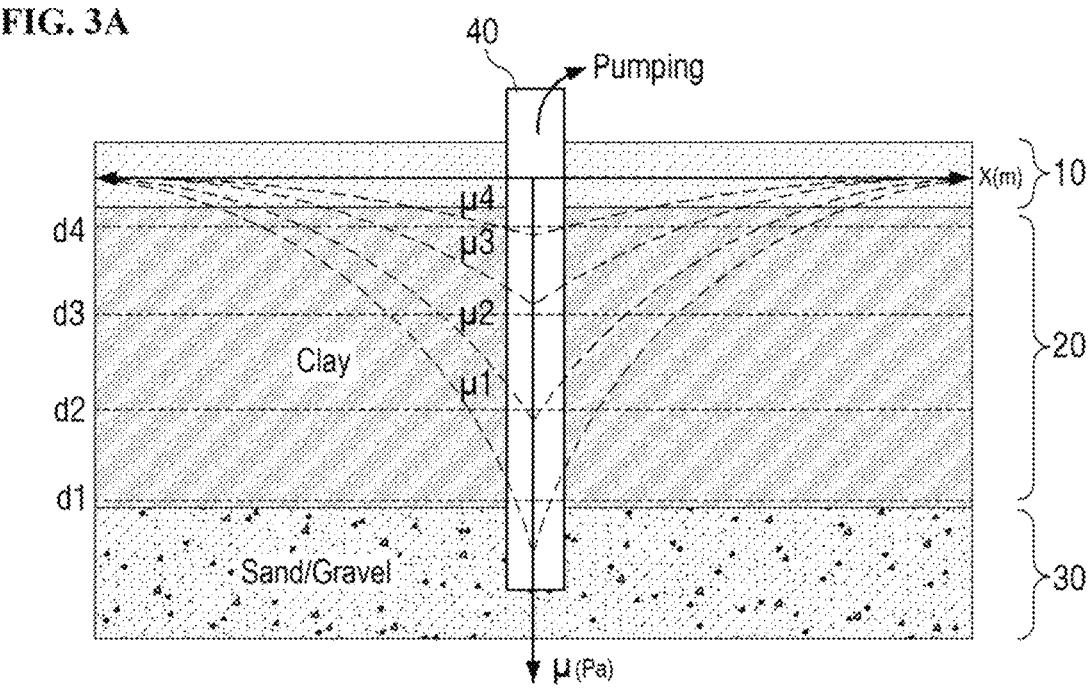
FIG. 3A is a diagram for explanation of vertical change in pore water pressure according to a depth of the aquiclude during pumping.
Figure 3B:
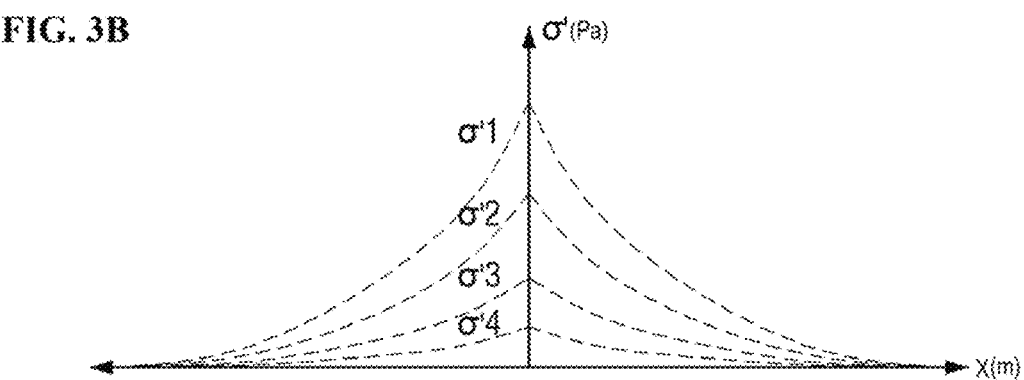
FIG. 3B is a diagram showing change in effective stress according to change in pore water pressure.

Change in the pore water pressure μ of the aquiclude 20 will be described in more detail. FIG. 3A is a diagram for explanation of vertical change in pore water pressure according to a depth of the aquiclude 20 during pumping and FIG. 3B is a diagram showing change in effective stress according to change in pore water pressure.

Referring to FIG. 3A, FIG. 3A shows horizontal distribution of the pore water pressure μ at each of depths d1, d2, d3, and d4 of the aquiclude 20 when water is pumped from the confined aquifer 30 and the pore water pressures at the depths d1, d2, d3, and d4 are indicated by μ1, μ2, μ3, and μ4, respectively. As described with reference to FIGS. 2A and 2B, it may be seen that influence of the confined aquifer 30 is increased and the pore water pressure μ is remarkably reduced downward in the aquiclude 20 and the pore water pressure μ lowly changes upward in the aquiclude 20.

In general, most land deformation is caused by deformation of the aquiclude. In the case of consolidation of the aquiclude due to water level drop, a subsidence amount may be calculated in consideration of effective stress. FIG. 3B shows change in effective stress in each depth due to change in pore water pressure. Effective stress σ' may be immediately derived from the pore water pressure μ according to Equation 1 and effective stress at the depths d1, d2, d3, and d4 in the aquiclude 20 is indicated by σ'1, σ'2, σ'3, and σ'4, respectively.

$$\sigma' = \sigma - \mu \ (\sigma \text{ is total stress}) \quad [\text{Equation 1}]$$

According to an exemplary embodiment of the present invention, when a water level of the aquiclude 20 is maintained at a preset design value even if a water head of the confined aquifer 30 changes, change in the water head of the aquiclude may be alleviated and land deformation due to change in effective stress of the aquiclude may be prevented.

Accordingly, according to an exemplary embodiment of the present invention, a well may be buried in the aquiclude 20 and a water level in the well may be kept constant. That is, change in the water head in the confined aquifer 30 may be prevented from spreading to the aquiclude 20 by maintaining a high water level in a well of the aquiclude 20 when water is pumped from the confined aquifer 30 and maintaining a low water level in the well of the aquiclude 20 when underground water is injected into the confined aquifer 30.

Figure 4A:
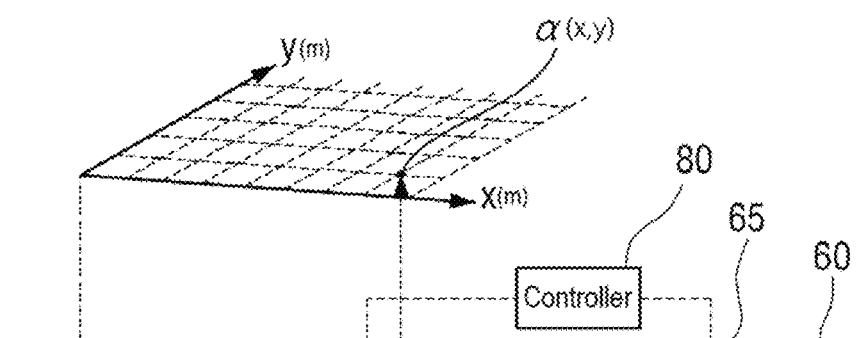
FIGS. 4A and 4B are diagrams for explanation of a system for controlling land deformation of an aquiclude according to an exemplary embodiment of the present invention.
Figure 4B:
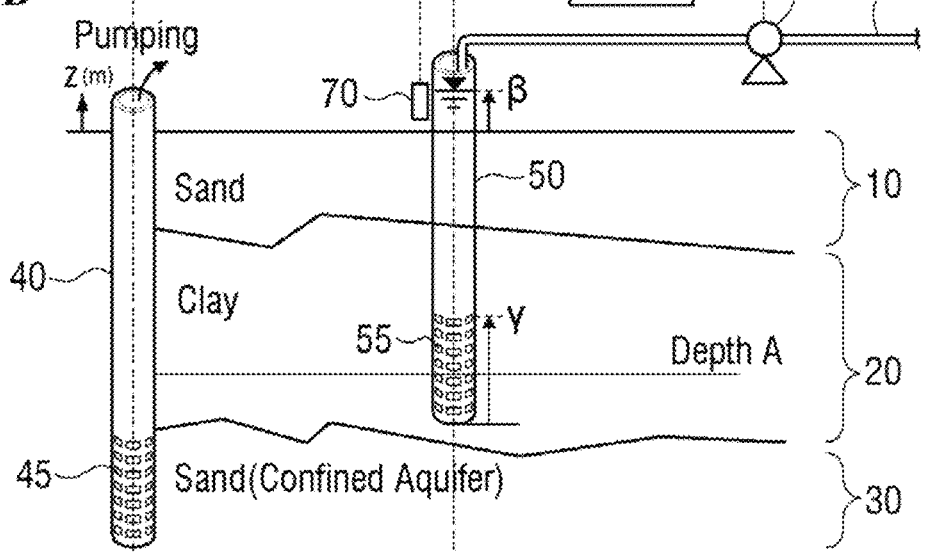
Figure 4C:
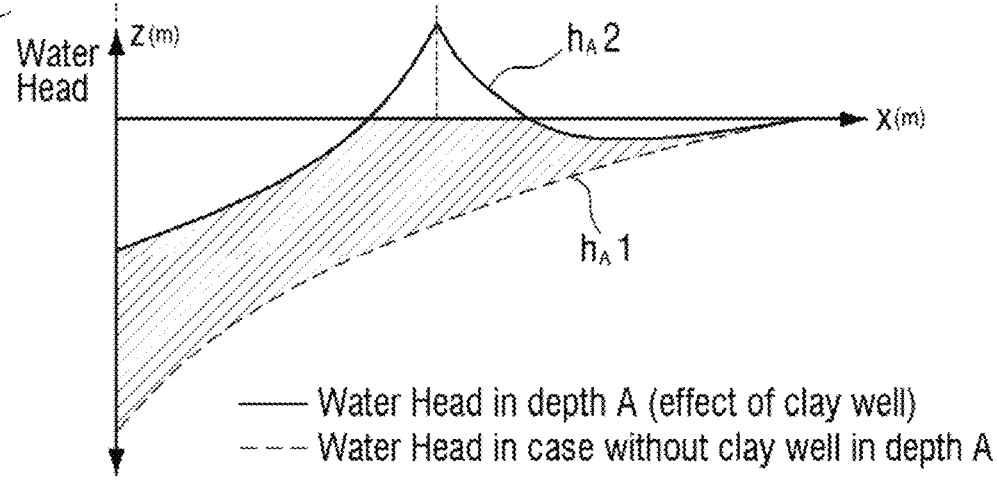
FIG. 4C is a diagram for explanation of change in water head of the aquiclude at a depth A.

FIGS. 4A and 4B are diagrams for explanation of a system for controlling land deformation of an aquiclude according to an exemplary embodiment of the present invention. FIG. 4C is a diagram for explanation of change in water head of the aquiclude at a depth A.

Referring to FIGS. 4A and 4B, the system for controlling land deformation according to an exemplary embodiment of the present invention may include a first well 40 and a second well 50. According to an alternative embodiment of the present invention, the system for controlling land deformation may further include a water pipe 60, the pump 65, a water level sensor 70, and a controller 80 as well as the first well 40 and the second well 50.

The first well 40 may be buried up to the depth of the confined aquifer 30 and may function as a pumping well for pumping underground water of the confined aquifer. According to an exemplary embodiment of the present invention, the plurality of through holes 45 may be formed in a lower portion of the first well 40 and underground water of the confined aquifer may be absorbed through the through holes 45 and discharged over ground.

FIG. 4C shows a water head of an aquiclude at a depth A of FIG. 4B that is selected as an arbitrary point in the aquiclude 20. When an initial water head height prior to pumping of the confined aquifer 30 is 0, as water is pumped from the confined aquifer using the first well 40, a water head of the aquiclude gradually drops and is indicated by a dotted line of $h_A 1$.

As such, on the assumption that a water head drops because the first well 40 is buried and water is pumped from the confined aquifer 30, the second well 50 may be buried up to a depth of the aquiclude 20 according to an exemplary embodiment of the present invention.

The second well 50 may be installed to be spaced apart from the first well 40 by a predetermined distance and a lower end portion of the second well 50 may be positioned in the aquiclude 20. In the drawing, assuming that a position of the first well 40 is the origin (0, 0), the second well 50 is illustrated to be buried at a point α (x, y) from the first well 40 in a horizontal direction. A point at which the second well 50 is buried is not particularly limited. However, the second well 50 is used to recover a water head of the aquiclude 20 and, thus, may be buried at an arbitrary position in a region of the aquiclude 20, which is affected by drop in the water head of the aquiclude 20 due to pumping from the confined aquifer 30. One or more second wells 50 may be installed along a circumference of the first well 40 and, according to an exemplary embodiment of the present invention, for convenience of description, the second well 50 is illustrated as positioned as illustrated in FIG. 4A.

According to an exemplary embodiment of the present invention, the second well 50 may include a screen including a circular main body and a plurality of through holes 55 formed along a circumference of the main body at a lower portion of the main body, like a generally used well. A height γ of the screen is not particularly limited, but the second well 50 is installed to recover a water head of the aquiclude 20 and, thus, the screen may be positioned in the aquiclude 20.

Since the second well 50 is assumed to be buried in the aquiclude 20 while water is pumped from the confined aquifer using the first well, a water head of underground water in the second well 50 immediately after the second well 50 is buried may have a value (e.g., a water head value or a similar value thereto at a corresponding point of the X axis in a plot $h_A1$) less than 0 in FIG. 4C.

According to an exemplary embodiment of the present invention, a water level of the second well 50 may be set to a preset value β and may be maintained. In this case, the preset value β may be a value greater than a current water head value and, for example, may be set to a higher value than an initial water head (i.e., 0). Although described below, a location α (x,y) of the second well 50, a set value β of a water head in the second well, and a height γ of a screen including the through holes 55 may be set to appropriate values in consideration of a water head recovery effect according to the second well 50.

According to the present invention, when the water level of the second well 50 buried in the aquiclude 20 is maintained at the preset value β, the water head of the aquiclude may rise to $h_A2$ from $h_A1$, as illustrated in FIG. 4C. That is, a hatched region (a difference between a solid line and a dotted line) in FIG. 4B indicates an effect whereby a water head of an aquiclude, which drops by pumping water from the confined aquifer, rises by the second well 50. Accordingly, according to the present invention, the second well 50 is installed and a water level in the second well is maintained at the preset value β to reduce change in the water head of the aquiclude and, thus, land deformation caused by change in effective stress may be prevented.

A device for maintaining the water level of the second well 50 to the preset value β may be embodied according to various embodiments of the present invention. According to an exemplary embodiment illustrated in FIG. 4B, the land deformation control system may include the water pipe 60, the pump 65, the water level sensor 70, and the controller 80.

The water level sensor 70 may measure a water level of the second well 50. One end of the water pipe 60 may be connected to the second well 50 and the other end may be connected to an external water storage tank. Here, the external water storage tank may be an arbitrary target for discharging or pumping water, for example, a lake, a reservoir, a river, or a water tank.

The pump 65 may be coupled to an arbitrary path of the water pipe 60 and operated to discharge water of the second well 50 to an external water storage tank or operated to supply water to the second well 50 from the external water storage tank. The controller 80 may receive a sensing value of a height of a water head from the water level sensor 70 and control driving of the pump 65 based on the received sensing value to maintain a water level of the second well 50 at the preset value β.

As such, according to an exemplary embodiment of the present invention, the second well 50, the pump 65, the water level sensor 70, the controller 80, and so on may constitute the land deformation control system and the water level of the second well 50 may be automatically maintained at the set value β by the controller 80, thereby reducing change in the water head of the aquiclude and preventing land deformation.

Deformation of the aquiclude 20 may be land subsidence or the like on a layer surface and a deformation amount may be varied according to the location thereof. This is because distribution of water head change of the confined aquifer or distribution of aquiclude thickness is not uniform. Accordingly, a water head recovery effect of the aquiclude may be varied according to how each of the location α of the second well 50, the set value β of the water head, and the screen height γ is set.

With regard to the location α at which the second well 50 is installed, a water head rising effect due to the second well 50 is enhanced toward a pumping well, that is, the first well 40 if possible, but there are various factors such as an irregular thickness of the aquiclude in an actual environment and, thus, it may not be most effective to install the second well 50 close to the first well.

As the set value β of the water head of the second well 50 is set to be high if possible, an amount of water head recovery of the aquiclude is increased but an excessive water head rise region is increased, which is not effective.

Figure 5:
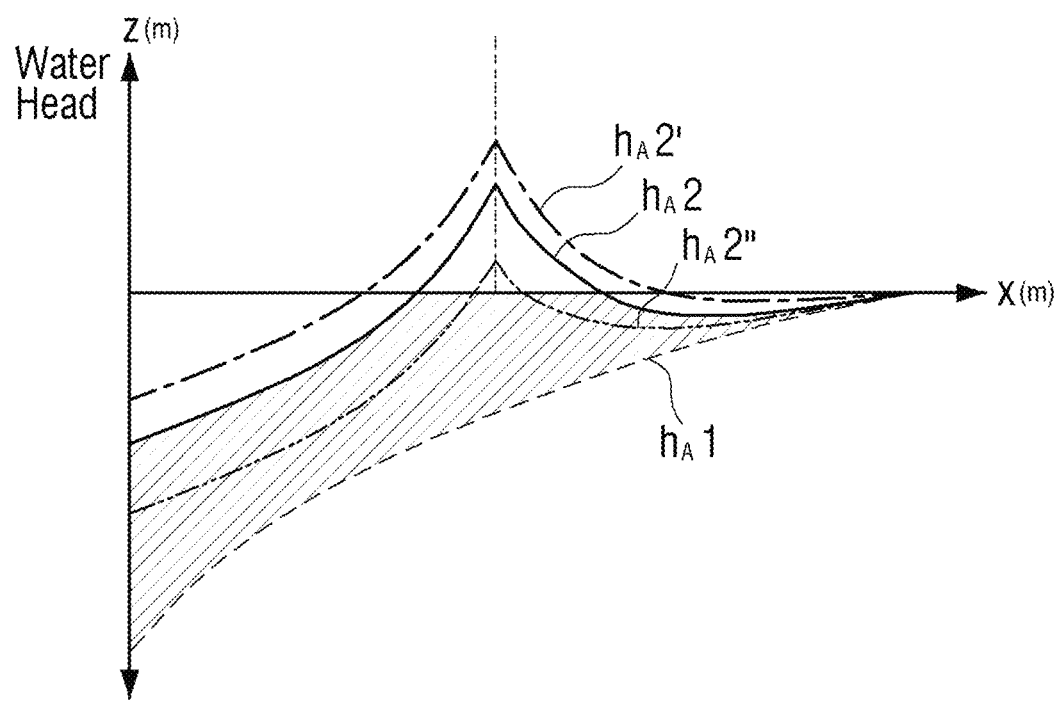
FIG. 5 is a diagram for explanation of change in water head of an aquiclude according to a design variable of a second well.

In this regard, FIG. 5 shows a horizontal (X direction) distribution of the water head at an arbitrary depth (e.g., depth A) in the aquiclude and curves $h_A1$ and $h_A2$ of FIG. 5 correspond to plots $h_A1$ and $h_A2$ of FIG. 4C, respectively. When the set value β of the water head of the second well 50 is set to be high, the water head rise effect is enhanced like in an example indicated by a plot $h_A2'$ in FIG. 5. However, in this case, an upper region of the X axis, that is, an excessive water head rise region in which a water head rises to an initial height (i.e., 0) or more is increased and, thus, this is not effective. On the other hand, when the set value β is reduced, a water head may recovered and a water head rise effect may be reduced as shown in a plot $h_A2''$ and, thus, it may not be effective.

When the screen height γ of the second well 50 is increased, a corresponding amount of water is supplied to the aquiclude 20 and, thus, an amount of water head recovery similar to $h_A2'$ of FIG. 5 is achieved. On the other hand, when the screen height γ is reduced, water supply may be reduced and, thus, a plot similar to $h_A2''$ of FIG. 5 may be achieved.

Hereinafter, change in water head of the aquiclude 20 when water is injected into the confined aquifer 30 and a configuration of a land deformation control system according to the present invention will be described with reference to FIGS. 6, 7A and 7B.

Figure 6:
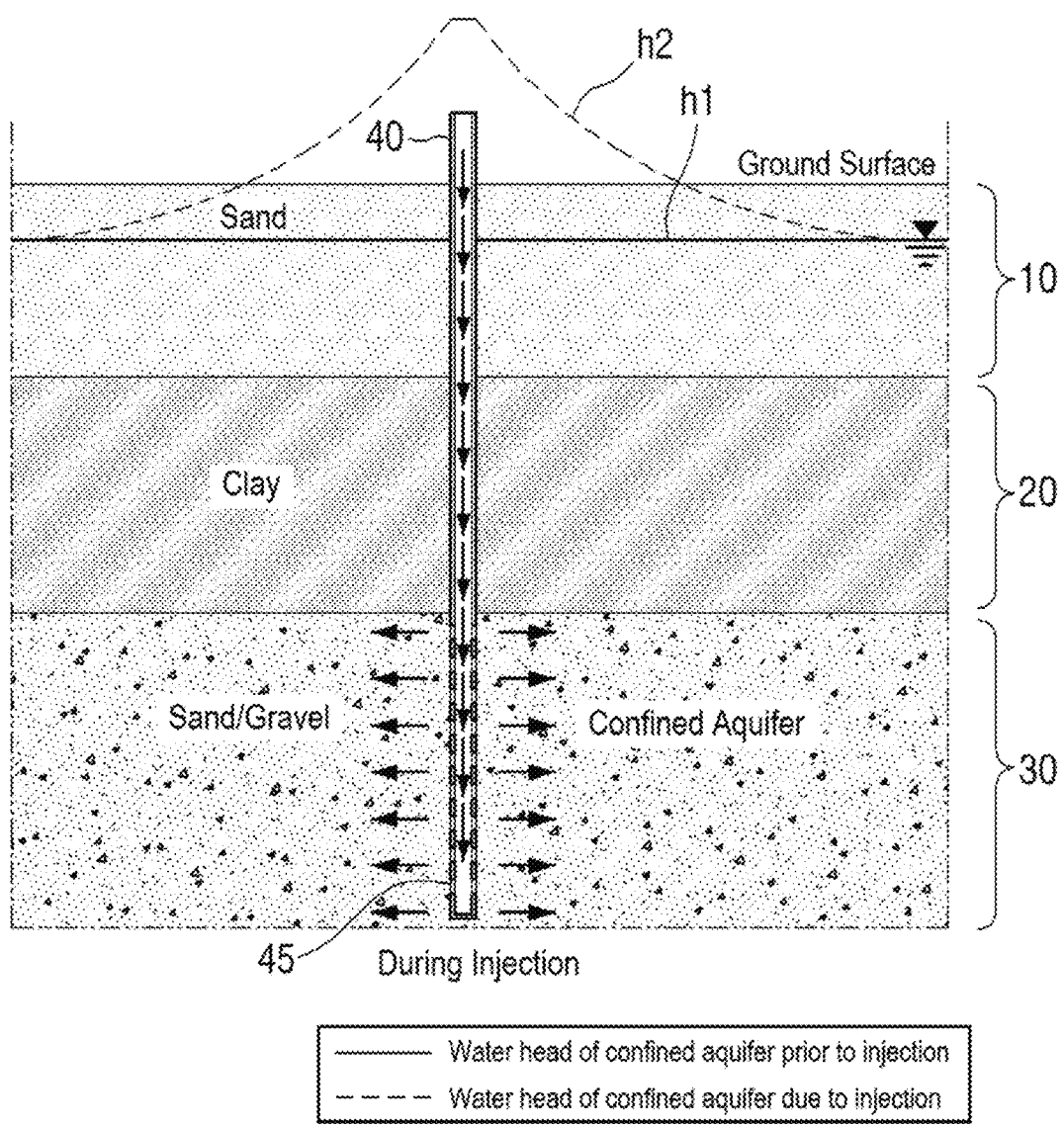
FIG. 6 is a diagram for explanation of change in water head of a confined aquifer during underground water injection.

FIG. 6 is a diagram for explanation of change in water head of a confined aquifer during water injection. FIGS. 7A and 7B are diagrams for explanation of vertical change in water head according to a depth during water injection in an equilibrium state.

Referring to FIG. 6, it may be assumed that, if water is injected into the confined aquifer 30, a layer structure around the confined aquifer and a structure of the well 40 are similar to or the same as in FIG. 1. A water head of the confined aquifer before water is injected into the confined aquifer 30 may be indicated as h1 which is an imaginary water level. Then, when water is injected into the confined aquifer 30 through the plurality of through holes 45 formed at a lower portion of the well 40, a water head rises as indicated by plot h2 in FIG. 6.

The layer structure of FIG. 7A is the same as in FIG. 2A, a vertical axis indicates a layer depth d in a graph of FIG. 7B, and a horizontal axis in FIG. 7B indicates the pore water pressure μ at each depth d. As indicated by a solid plot, it is assumed that the initial pore water pressure μ1 before water is injected into the confined aquifer 30 is increased in proportion to the depth d. When water is injected into the confined aquifer 30, an underground water level of the confined aquifer almost immediately changes.

Accordingly, the pore water pressure μ in the confined aquifer may be rapidly and constantly reduced over an entire depth of the confined aquifer and may rise as indicated by a dotted line μ2.

In this case, since the aquiclude 20 has very low hydraulic conductivity, a water head above the aquiclude 20 nearly unchanges at an initial stage and a water head gradually changes from a lower portion of the aquiclude 20, which contacts the confined aquifer 30. Accordingly, the water head of the aquiclude 20 most rapidly changes in a lower portion and change in the water head of the aquiclude 20 spreads upward over time. That is, as indicated by a curved portion of a dotted line plot μ2 of FIG. 7B, the pore water pressure μ in the aquiclude 20 is nearly unaffected, whereas the pore water pressure is increased at a lower portion of the aquiclude, that is, a portion adjacent to the confined aquifer 30, which is almost the same as in the confined aquifer 30.

According to this configuration, the land deformation control system according to an exemplary embodiment of the present invention may have similar or the same configuration as in FIG. 4B. That is, the land deformation control system according to an exemplary embodiment of the present invention may include the first well 40, the second well 50, the water pipe 60, the pump 65, the water level sensor 70, and the controller 80. Configurations and functions of components are similar to the same as those during pumping of the confined aquifer and, thus, a detailed description thereof will be omitted herein.

However, when water is injected into a confined aquifer, an initial value (in FIG. 4C) of a water head of an aquiclude immediately after the second well 50 is buried may be a value (e.g., referred to as "h3" hereinafter) greater than 0. According to an exemplary embodiment of the present invention, when the set value β of the second well 50 is set to a value less than 0, there is a worry about land subsidence and, thus, the set value β may be set in the range between 0 and h3.

In order to design the second well installed for land deformation during water pumping or injection with respect to the confined aquifer, the second well needs to be designed in overall consideration of the location α of the second well, the set value β of a water head, the screen height γ, and so on, as described above.

Hereinafter, a method for optimal design of a second well according to an exemplary embodiment of the present invention will be described with reference to FIGS. 8 to 14. For convenience of description, hereinafter, an optimal method will be described in terms of the case in which water is pumped from a confined aquifer and the case in which water is injected into the confined aquifer will be subsidiarily described when the case in which water is injected and the case in which water is pumped need to be differentiated.

Figure 8:
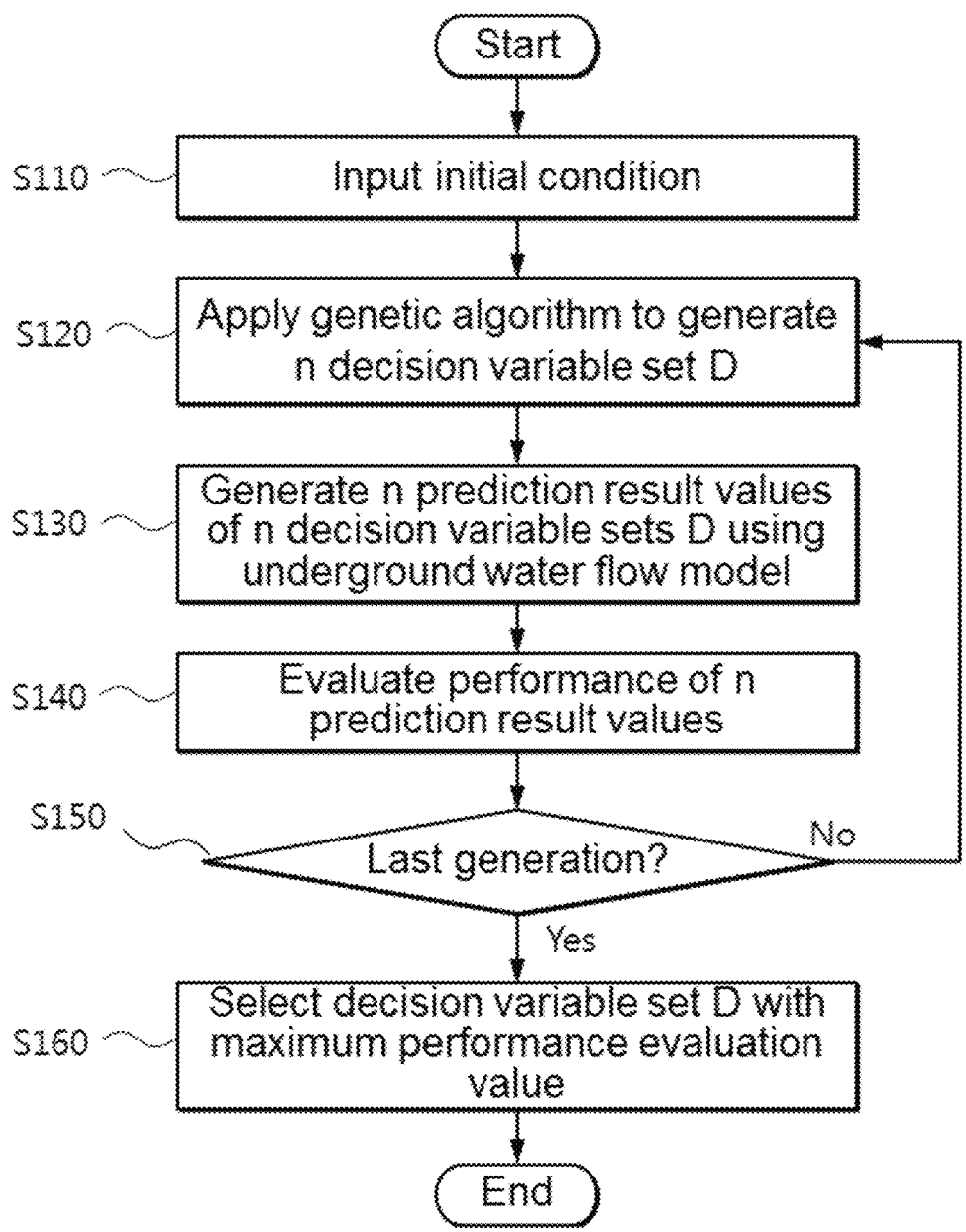
FIG. 8 is a flowchart of an example of a method for optimal design of a second well according to an exemplary embodiment of the present invention.

FIG. 8 is a flowchart of an example of a method for optimal design of a second well according to an exemplary embodiment of the present invention.

First, in operation S110, initial condition data may be input to an optimization algorithm. Here, the initial condition data may be data to be input when the optimization algorithm is executed and, for example, may include data about horizontal and vertical distribution of change in water head of an aquiclude when only the first well 40 is buried underground and water is pumped from or injected into a confined aquifer.

Figure 9:
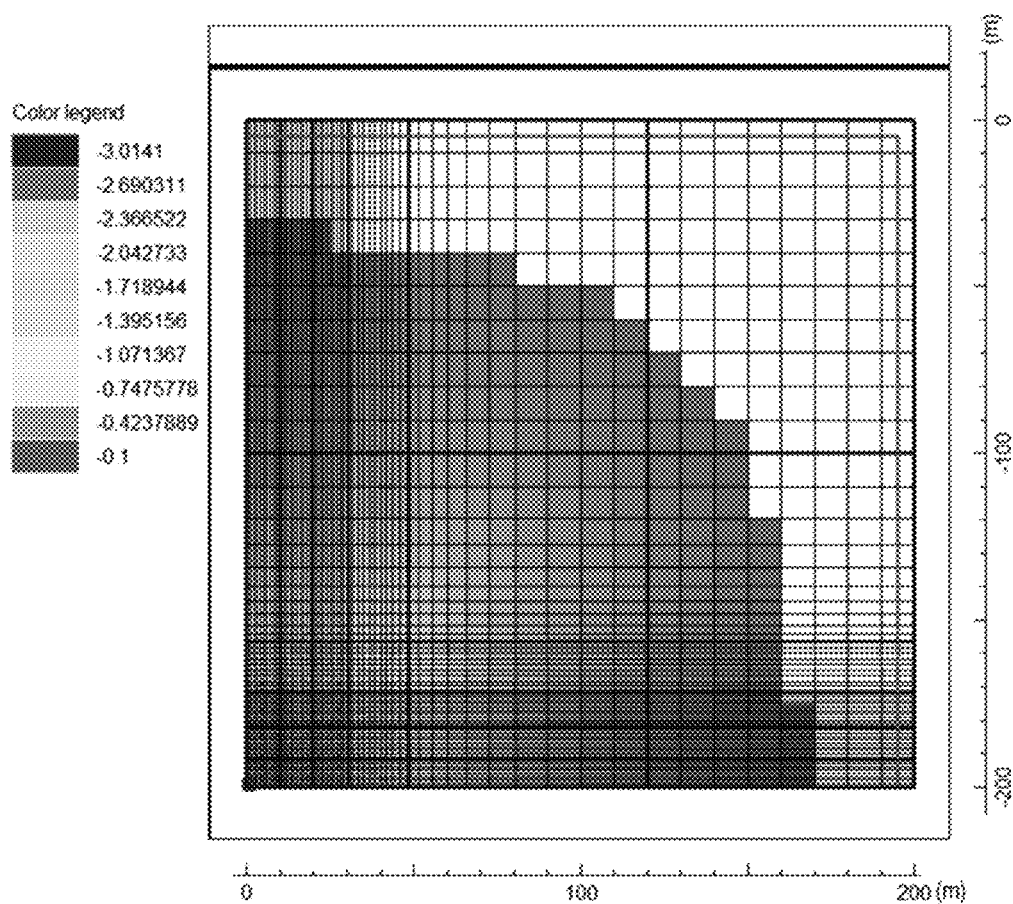
FIG. 9 is a diagram for explanation for an exemplary initial condition applied to an optimization algorithm used according to an exemplary embodiment of the present invention.

In this regard, FIG. 9 is a diagram for explanation for an exemplary initial condition of an aquiclude. A graph of FIG. 9 shows an amount of drop in water head via pumping of a confined aquifer. In FIG. 9, an X-Y axis plane is obtained by viewing from above a region in which the first well 40 is installed and the first well 40 is assumed to be positioned at a left lower edge. As seen from FIG. 9, a water head of an aquiclude adjacent to the first well 40 drops by about 3 m via pumping of a confined aquifer, and the water head drops away from the first well and, then, does not drop at a radius of about 170 m.

As such, horizontal and vertical distribution of a water head of an aquiclude when only the first well 40 is installed and water is pumped from (or injected into) the confined aquifer for a predetermined time period may be used as an initial condition of an optimization algorithm. That is, at least some of data of a horizontal and vertical scale of a simulation target, a thickness of each of an overburden, an aquiclude, and a confined aquifer, pores and permeability of each layer, a pumping time period (or injection time period) of a confined aquifer, and a pumping amount (or injection amount) of the confined aquifer may be used as an initial condition.

When the initial condition data is input to an optimization algorithm, in operation S120, the optimization algorithm may be applied to generate n (n is an integer equal to or greater than 2) decision variable sets D of the second well. In this case, the decision variable may be a variable required to design the second well 50 and, as described above, may include at least one of the location α of the second well, the setting value β of a water head of an aquiclude, and the screen height γ of the second well. According to an alternative embodiment, the decision variable may include other design values, for example, the number of second wells 50 to be installed. In the illustrated embodiment, for convenience of description, the three variables α, β, and γ are assumed to be the decision variables and, accordingly, n decision variable sets D (α, β, γ) may be generated using the optimization algorithm in operation S120.

The optimization algorithm may be one of well-known optimization algorithms such as a genetic algorithm, a neural network algorithm, a particle swarming scheme, a differential evolution scheme, a Newton scheme, and a steepest descent scheme. According to the present embodiment, it is assumed that the genetic algorithm is used. In general, a genetic algorithm is one of representative methods for overcoming optimization problems and is a type of evolutionary computation obtained by imitating biological evolution. The genetic algorithm is an algorithm for representing possible optimal solutions of an objective function in a predetermined form of a data structure and, then, repeatedly searching the solutions to find a most optimal solution.

According to an exemplary embodiment of the present invention, in operation S110, when the initial condition data is input to the genetic algorithm, n decision variable data sets D (α, β, γ) via crossover and mutation may be generated using the genetic algorithm. For example, when 25 decision variable data sets D are set to be generated (i.e., n=25), data sets of $D_1$ (α1, $β_1$, $γ_1$), $D_2$($α_2$, $β_2$, $γ_2$), ..., $D_{25}$($α_{25}$, $β_{25}$, $γ_{25}$) may be generated via operation S120.

Then, when n data sets are generated, in operation S130, each of the n data sets may be applied to an underground water flow model to generate n simulation results of change in water head of the aquiclude water head. In this case, the used underground water flow model may be, for example, MODFLOW and may be, but is not limited to, arbitrary underground water modeling algorithms (underground water flow numerical models for simulation of three-dimensional (3D) flow in a heterogeneous layer such as MODFLOW and FEFLOW), needless to say.

When each of the n data sets D generated in operation S120 is applied to the underground water flow model, n prediction results (simulation results) of horizontal and vertical distribution of a water head of an aquiclude may be generated as shown in a plot $h_A2$ of FIG. 4C.

Then, in operation S140, performance evaluation may be performed on each of the n prediction results. According to an exemplary embodiment of the present invention, performance evaluation may be performed by, for example, predefining an evaluation function for performance evaluation and inputting each of the n prediction results to the evaluation function to calculate an evaluation value.

Performance evaluation will be described with respect to the case in which water is pumped from an confined aquifer and the case in which water is injected into the confined aquifer.

When water is pumped from the confined aquifer, a performance evaluation value of each of the n prediction results may be determined based on a value of a predefined first evaluation function. According to an exemplary embodiment of the present invention, a first evaluation function may include at least one item of "head recovery ratio", "head recovery volume ratio", and "excessive water head rise volume ratio" in an entire portion of the aquiclude or at an arbitrary depth (e.g., a point of depth A of FIG. 4B) of the aquiclude.

The water head recovery ratio may be defined as a value that is proportional to a ratio of [an amount of water head recovery of the aquiclude due to the second well] to [an amount of drop in water head due to pumping of the confined aquifer]. That is, the water head recovery ratio may be, for example, a value that is proportional to a ratio of a recovery amount of underground water of a hatched region between plots $h_A2$ and $h_A1$ in FIG. 4B with respect to a reduction amount of underground water in a region between the X axis and a plot $h_A1$ in FIG. 4C.

The water head recovery volume ratio may be defined as a value that is proportional to a ratio of [a volume affected by water head recovery of the aquiclude due to the second well] to [a volume affected by drop in water head of the aquiclude due to pumping of the confined aquifer]. That is, the water head recovery volume ratio may be, for example, a value that is proportional to a ratio of a space (volume) of a hatched region of FIG. 4C to a space (volume) between the X axis and a plot $h_A1$ of FIG. 4C.

The excessive water head rise volume ratio may be defined as a value that is proportional to a ratio of [a volume of a region having a higher water head than an initial water head of the aquiclude] to [a volume affected by water head recovery of the aquiclude due to the second well]. That is, the excessive water head rise volume ratio may be, for example, a value that is proportional to a ratio of a space (volume) of a region between the X axis and a plot $h_A2$ in FIG. 4C to a space (volume) of a hatched region of FIG. 4C.

According to an exemplary embodiment of the present invention, the first evaluation function may include at least one of "head recovery ratio", "head recovery volume ratio", and "excessive water head rise volume ratio" in the aquiclude, and in detail, may be proportional to at least one of the water head recovery ratio and the water head recovery volume ratio and may be inversely proportional to the excessive water head rise volume ratio. For example, when all of the above three items (head recovery ratio, water head recovery volume ratio, and excessive water head rise volume ratio) are considered, the first evaluation function may be defined as, for example, Equation 2 below or any function that is proportional to Equation 2 below.

[Equation 2]

$$\text{First Evaluation Function } (F) = \\ \frac{\text{Recovery amount of water head (after application)}}{\text{Drop amount of water head (prior to application)}} + \\ \frac{\text{Volume affected by water head recovery (after application)}}{\text{Volume affected by drop in water head (prior to application)}} - \\ \frac{\text{Excessive water head rise volume (after application)}}{\text{Volume affected by water head recovery (after application)}}$$

In this case, three right terms of the above first evaluation function may sequentially refer to a water head recovery ratio, a water head recovery volume ratio, and an excessive water head rise volume ratio, respectively, from the left.

When water is injected into the confined aquifer, a performance evaluation value of each of the n prediction results may be determined based on a value of a predefined second evaluation function. According to an exemplary embodiment of the present invention, the set value β of a water head when water is injected into the confined aquifer may be determined to be a height of an original water head before water is injected. This is because land subsidence is caused when a water head of the aquiclude drops to the original water head or less.

Accordingly, when the second evaluation function is set, the second evaluation function may include at least one item of a water head recovery ratio and a water head recovery volume ratio in an entire portion of the aquiclude or at an arbitrary depth (e.g., a point of depth A of FIG. 4B) of the aquiclude and may be, for example, Equation 3 below or any function that is proportional to Equation 3 below.

[Equation 3]

$$\text{Second Evaluation Function } (F) = \\ \frac{\text{Recovery amount of water head (after application)}}{\text{Rise amount of water head (prior to application)}} + \\ \frac{\text{Volume affected by water head recovery (after application)}}{\text{Volume affected by rise in water head (prior to application)}}$$

In the above second evaluation function, a first right term may refer to a water head recovery ratio and may be defined as a value that is proportional to a ratio of [an amount of water head recovery of the aquiclude due to the second well] to [an amount of drop in water head due to injection of the confined aquifer]. A second right term may refer to a water head recovery volume ratio and may be defined as a value that is proportional to a ratio of [a volume affected by water head recovery of the aquiclude due to the second well] to [a volume affected by rise in water head of the aquiclude due to injection of the confined aquifer].

As such, the second evaluation function of Equation 3 above includes a water head recovery ratio and a water head recovery volume ratio, and a water head of the aquiclude is fixed to an original water head and, thus, it is not necessary to consider the excessive water head rise volume ratio included in the first evaluation function when the confined aquifer is pumped.

Referring back to FIG. 8, in operation S140, the n performance evaluation values of each of the n simulation result values of distribution of a water head of the aquiclude may be obtained using the first evaluation function or the second evaluation function.

Then, if operation S140 is performed with respect to the last generation of the genetic algorithm (i.e., if "Yes" in operation S150), the genetic algorithm may proceed to operation S160 to select the data set D of a decision variable with a maximum value among the n performance evaluation values. However, when a preset last generation number is not reached (i.e., if "No" in operation S150), the genetic algorithm may return to operation S120 to repeatedly perform operation S120 of generating the n decision variable data sets D, operation S130 of deriving n simulation result values, and operation S140 of calculating n performance evaluation values. In this case, the preset generation number G in the genetic algorithm may be an integer equal to or greater than 2 and may be arbitrarily set as an initial condition by a user.

Figure 10A:
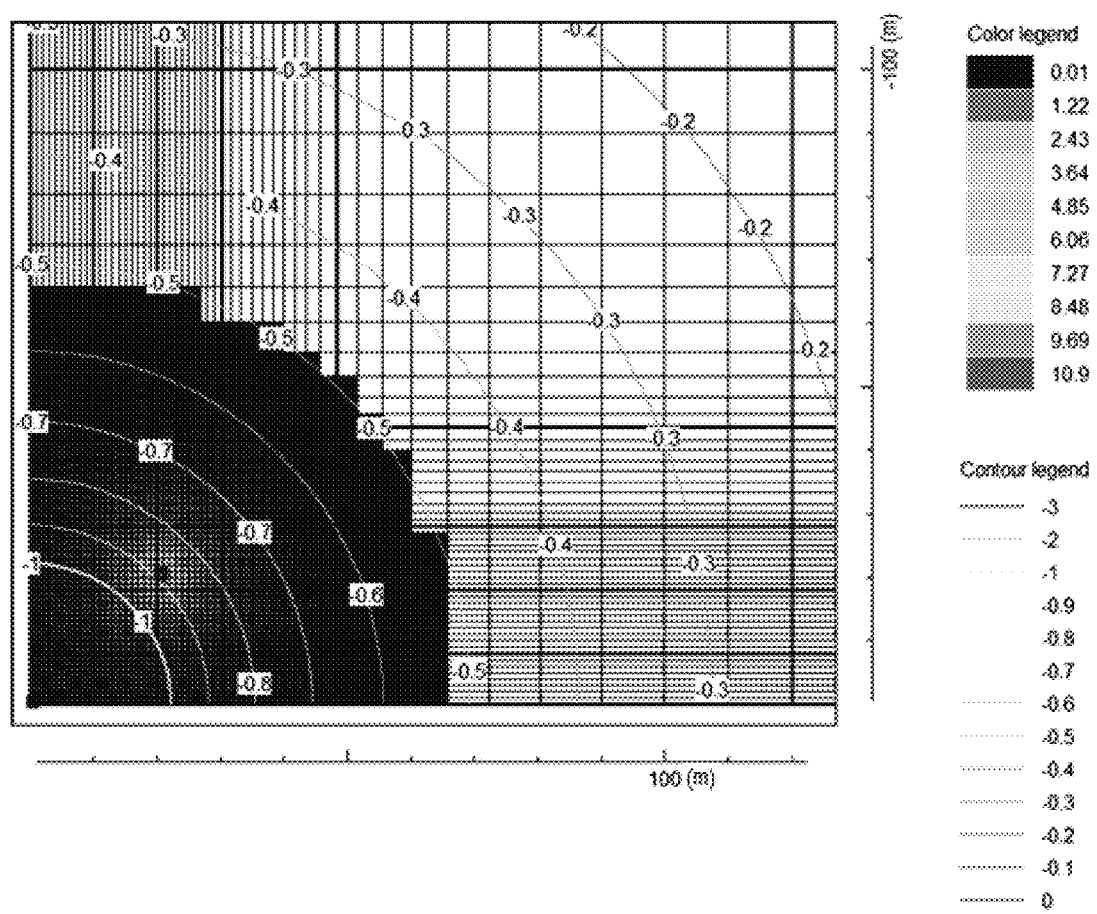
FIGS. 10A to 10C are diagrams illustrating an exemplary result of optimization design of a second well derived according to an underground water flow model according to an exemplary embodiment of the present invention.
Figure 10B:
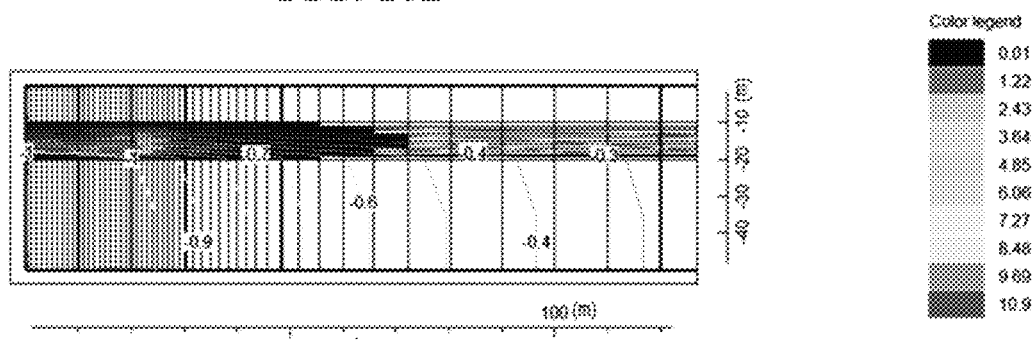
Figure 10C:
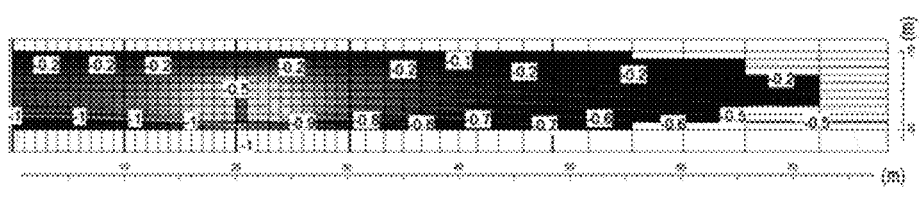

FIGS. 10A to 10C are diagrams illustrating an exemplary result of optimization design of a second well derived according to an underground water flow model according to an exemplary embodiment of the present invention.

FIGS. 10A to 10C illustrate a simulation result of the case in which distribution of change in water head of an aquiclude illustrated in FIG. 9 while an confined aquifer is pumped is used as an initial condition and the second well 50 is installed according to optimal design. FIG. 10A is a diagram of an experimental model viewed from the above, FIG. 10B is a lateral cross-sectional view of a layer including an overburden, an aquiclude, and an confined aquifer, and FIG. 10C is an enlarged view of the aquiclude. In this model, it is assumed that the overburden is positioned up to 10 meters underground, the aquiclude is positioned between 10 and 20 meters underground, and the confined aquifer is positioned below the aquiclude.

As shown in FIGS. 10A and 10B, according to a result of the experimental model, the second well 50 is installed at a point α spaced apart from the first well 40 by about 30 meters and, in this case, it is optimal to set the screen height γ of the second well to 5 meters and to set the set value β of a water head to 10 meters. Accordingly, as shown in FIGS. 10A to 10C, the water head adjacent to the second well is similar to the set value β and then the water head drops away from the second well but the water head rises due to the second well to a region to a radius of about 70 meters from the first well.

Figure 11:
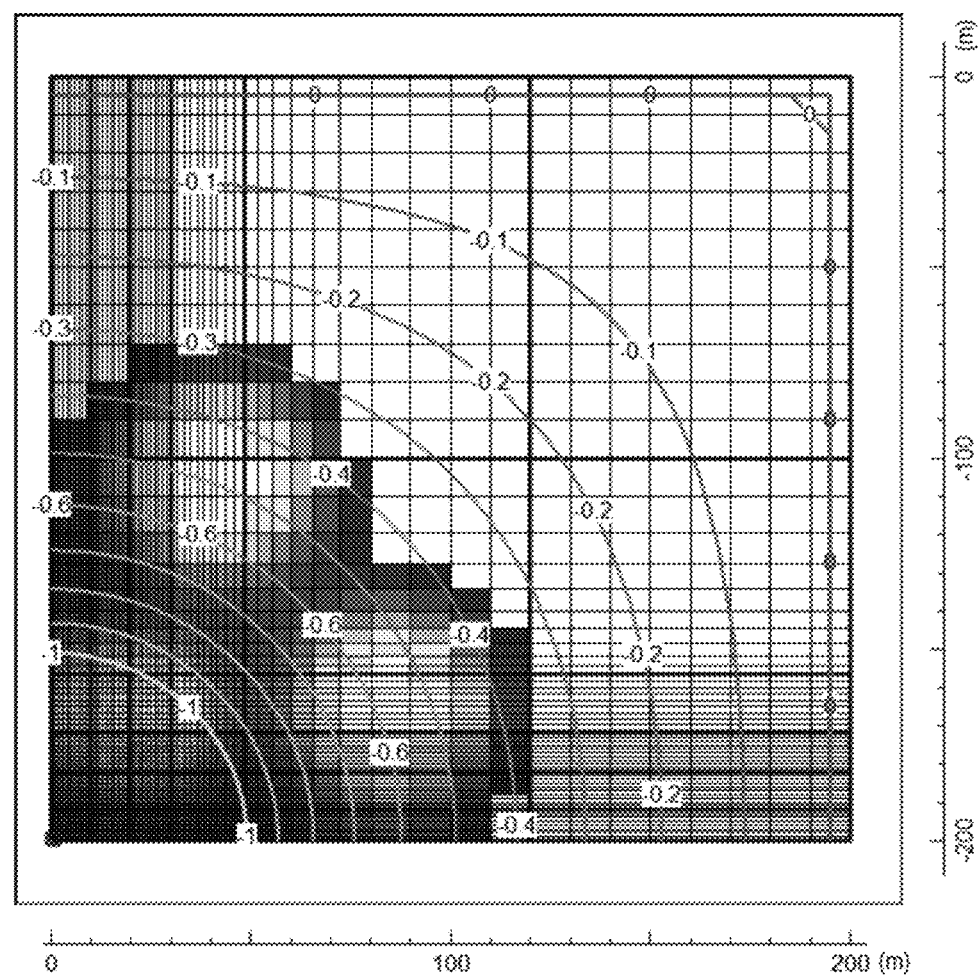
FIGS. 11 and 12 are diagrams illustrating an exemplary result of optimal design of the second well derived according to an underground water flow model when the number of second wells is assumed to be 3 and 4, respectively.
Figure 12:
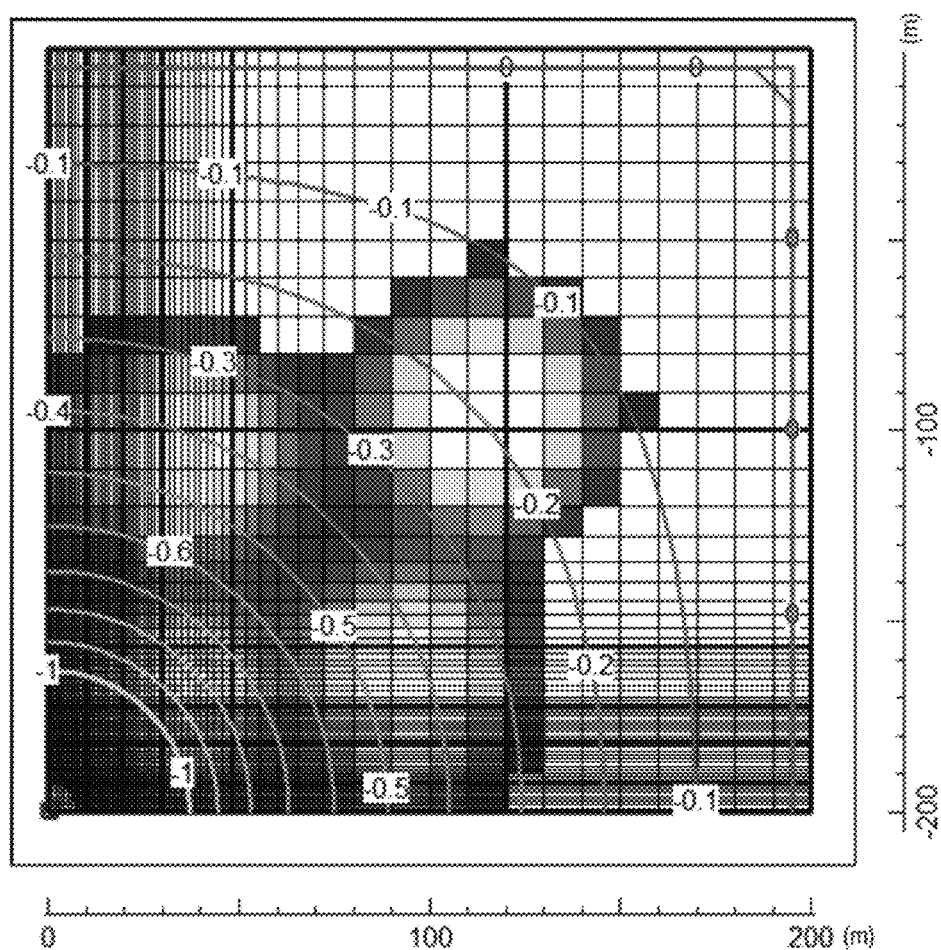

FIGS. 11 and 12 are diagrams illustrating an exemplary result of optimal design of the second well derived according to an underground water flow model when the number of second wells is assumed to be 3 and 4, respectively.

Referring to FIG. 11, when three second wells 50 are installed, it may be optimal to install one second well at a point spaced apart from the first well 40 by about 40 meters and to install the remaining two second wells at a point adjacent to the former second well by about 90 meters. In this case, a white region around the second well refers to a portion of water head recovery of 100%.

Referring to FIG. 12, when four second wells are installed, it may be optimal to install one second well at a point spaced apart from the first well by about 50 meters, to install two second wells at a point adjacent to the former second well by about 100 meters, and to install the remaining one second well at a point adjacent the former second well by about 150 meters.

Although FIGS. 11 and 12 show the cases in which the number of second wells is set to three or four as an initial condition and an optimization algorithm is executed and, according to an alternative embodiment, the number of second wells may be used as a decision variable and the optimization algorithm may be executed. That is, in this case, the decision variable data set D may also include the number of second wells and, in this case, if a plurality of second wells is selected, each second well may have at least one of its own distant distance a, set value β of water head of an aquiclude, and screen height γ.

Figure 13:
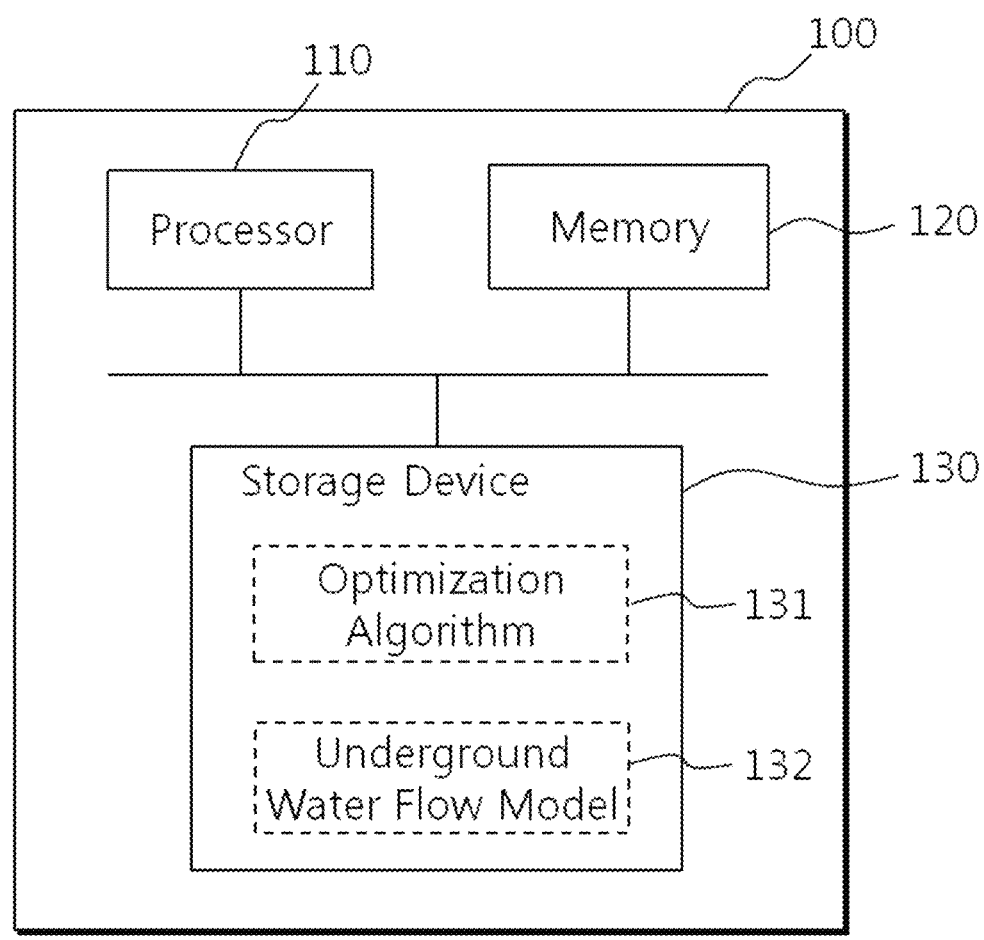
FIG. 13 is a block diagram for explanation of an exemplary structure of a system for optimal design of a second well according to an exemplary embodiment of the present invention.

FIG. 13 is a block diagram for explanation of an exemplary structure of a system for optimal design of a second well according to an exemplary embodiment of the present invention.

Referring to FIG. 13, a second well optimization design system 100 according to an exemplary embodiment of the present invention may be an arbitrary terminal device or server for executing operations of the flowchart described with reference to FIG. 8 and may include a processor 110, a memory 120, and a storage device 130, as illustrated in FIG. 13.

The storage device 130 may be a storage medium that semi-permanently stores data, such as a hard disk drive or a flash memory and may store at least one of the aforementioned various algorithms, for example, an algorithm such as an optimization algorithm 131 such as a genetic algorithm and an underground water flow model 132 such as MOD-FLOW or programs.

In this configuration, various programs or algorithms may be stored in the storage device 130 and, then, may be loaded and executed in the memory 120 under control of the processor 110. Alternatively, some programs or algorithms may be present in an external server or storage device separately from the optimization design system 100 according to the present invention and when the system 100 transmits data or variables to a corresponding external server or device, the external server or device executes some operations of the program or algorithm and then transmits the resultant data to the system 100.

While the invention has been described with reference to certain preferred embodiments thereof and drawings, the present invention is not limited to the above-described embodiments and various changes or modifications may be made based on the descriptions provided herein by those skilled in the art. The scope of the present disclosure should not be limited to and defined by the above-described exemplary embodiments, and should be defined not only by the appended claims but also by the equivalents to the scopes of the claims.

What is claimed is:

1. A land deformation control system with respect to a land comprising an confined aquifer and an aquiclude above the confined aquifer, the system comprising:
a first well for water pumping from or water injecting into the confined aquifer;
one or more second wells spaced apart from the first well by a predetermined distance and having a lower end portion positioned in the aquiclude,
a processor, and
a storage device having program instructions embodied therewith, the program instructions executable by the processor to cause the processor to:

control an amount of change in water head of the aquiclude, which drops or rises due to the pumping or injection of the confined aquifer, by maintaining a water level of each of the second wells at a preset water level value, based on determination that water is pumped from the confined aquifer by the processor, determine at least one of the distance between the first well and the one or more second well, the preset water level value, and a height of the screen based on a water head recovery ratio, a water head recovery volume ratio, and an excessive water head rise volume ratio at an arbitrary depth in the aquiclude, and determine at least one of the distance between the first well and the one or more second well, the preset water level value, and the height of the screen based on a function value of an evaluation function that is proportional to at least one of the water head recovery ratio and the water head recovery volume ratio and is inversely proportional to the excessive water head rise volume ratio, wherein the one or more second well comprises a cylindrical main body and a screen, the screen comprises a plurality of through holes formed at a lower portion of the main body along a circumference of the main body, and the screen is positioned in the aquiclude, wherein the water head recovery ratio is proportional to a ratio of an amount of water head recovery of the aquiclude due to the one or more second well to an amount of drop in water head due to the pumping of the confined aquifer, the water head recovery volume ratio is proportional to a ratio of a volume affected by water head recovery of the aquiclude due to the one or more second well to a volume affected by drop in a water head due to the pumping of the confined aquifer, and the excessive water head rise volume ratio is proportional to a ratio of a volume of a region having a higher water head than an initial water head of the aquiclude to a volume affected by water head recovery of the aquiclude due to the one or more second well.

2. The system of claim 1, wherein the one or more second well is installed at an arbitrary location in a region in which the water head of the aquiclude drops or rises due to the pumping or injection of the confined aquifer.

3. The system of claim 1, wherein, based on determination that water is injected into the confined aquifer by the processor, the program instructions further causes the processor to determine at least one of the distance between the first well and the one or more second well and a height of the screen based on at least one of a water head recovery ratio and a water head recovery volume ratio at an arbitrary depth in the aquiclude, the water head recovery ratio is proportional to a ratio of an amount of water head recovery of the aquiclude due to the one or more second well to an amount of rise in water head of the aquiclude due to the injection of the confined aquifer, and the water head recovery volume ratio is proportional to a ratio of a volume affected by water head recovery of the aquiclude due to the one or more second well to a volume affected by rise in water head of the aquiclude due to the injection of the confined aquifer.

4. The system of claim 1, further comprising:
a water level sensor configured to measure a water level of the one or more second well;
a water pipe with one end connected to an upper end portion of the one or more second well and the other end connected to an external water storage tank;
a pump coupled to the water pipe and configured to operate to discharge water of the one or more second well or to supply water to the one or more second well; and
a controller configured to receive a sensing value from the water level sensor and to control an operation of the pump based on the sensing value to maintain a water level of the one or more second well at the preset water level value.

* * * * *